Aug. 30, 1966  J. H. KEMP, JR  3,269,568
APPARATUS FOR UNSTACKING PALLETS
Original Filed Aug. 10, 1962  3 Sheets-Sheet 1

INVENTOR.
JOHN H. KEMP, JR.
BY
ATTORNEY

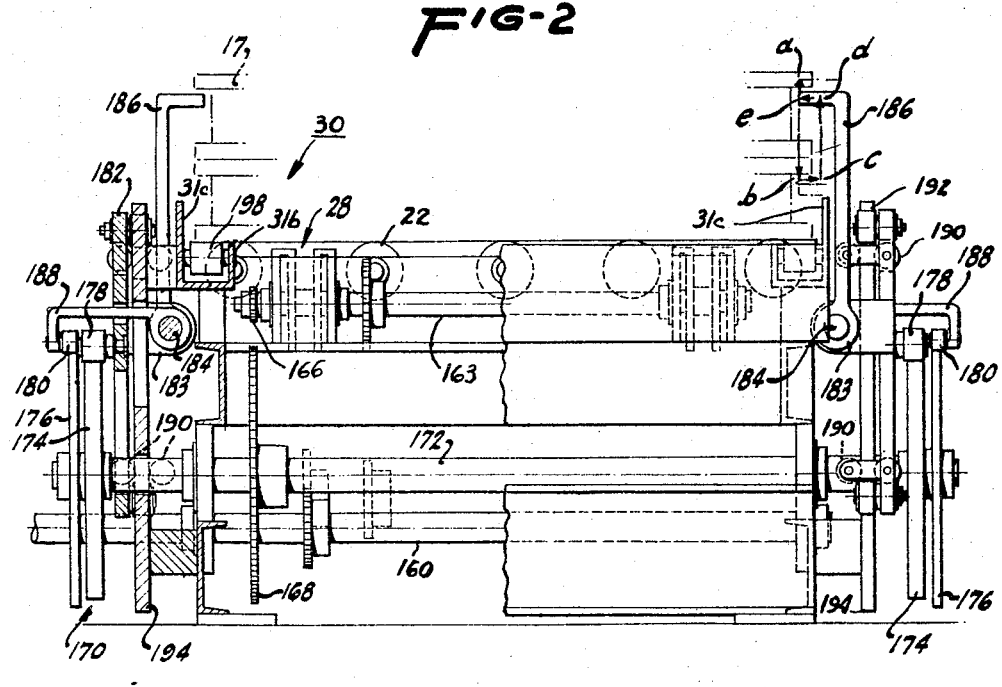
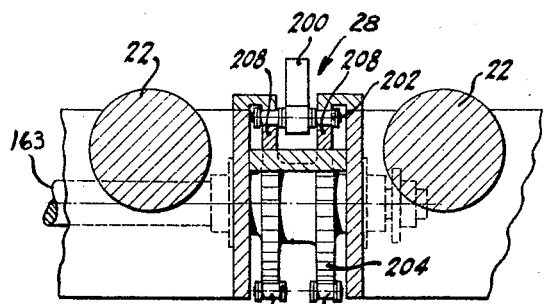

INVENTOR.
JOHN H. KEMP, JR.
ATTORNEY

United States Patent Office 3,269,568
Patented August 30, 1966

3,269,568
APPARATUS FOR UNSTACKING PALLETS
John H. Kemp, Jr., 140 Greenoak Drive, Atherton, Calif.
Original application Aug. 10, 1962, Ser. No. 216,100.
Divided and this application Aug. 23, 1965, Ser. No. 481,854
3 Claims. (Cl. 214—8.5)

This application is a divisional application of my co-pending application, Serial No. 216,100, filed August 10, 1962, now abandoned. The present invention relates to apparatus for handling pallets, and particularly concerns an apparatus for unstacking pallets from a vertical stack thereof.

In the said co-pending application, there is disclosed a machine for exchanging pallets whereby an exchange pallet is substituted for an incoming loaded pallet. In that machine, there is provided a conveyor line that passes through a transfer or exchange station. The pallets conducted along the conveyor line are of a type having slots or other suitable openings therein through which lift fingers of an elevator disposed below the conveyor line may pass. Positioning means on the conveyor line stop the pallet in the proper transfer position, the lift fingers rise until they pass through the pallet and engage and lift the load free thereof. Then, a transfer fork having a plurality of tines is extended horizontally to pass between th elevator lift fingers so as to be disposed between the load and the pallet from which it was removed. Then, the elevator is again lowered until the load is supported on the transfer fork and the lift fingers are then retracted from the pallet slots so that the pallet is free to move along the conveyor. A weighing mechanism may be incorporated with the transfer fork to weight the load while a new pallet is being moved in to replace the original. In this operation, a pallet unstacking mechanism feeds a replacement or exchange pallet one at a time from a supply, and the shipper's pallet is moved from the table while the replacement or exchange pallet is moved in place at the transfer or exchange station. When the replacement pallet is properly positioned, the lift fingers are again raised to pass through the slots of the replacement pallet and move up pass the tines of the transfer fork to remove the load therefrom freeing the transfer fork to be retracted out from under the load. Finally, the lift fingers are again lowered to replace the load on the replacement pallet and are then withdrawn through the slots of the replacement pallet to free it for removal to a delivery station, thus completing the transfer.

An object of this invention is to provide a pallet unstacking apparatus which may be employed with the machine of said co-pending application, Serial No. 216,100, filed August 10, 1962, now abandoned.

Another object of the invention is to provide an apparatus for retaining a plurality of exchange pallets in a vertical stack and adapted to shift a lower pallet from the stack towards a pallet transfer or exchange station.

Still another object of the invention is to provide a pallet unstacker which is automatically sequenced to elevate a vertical stack of pallets, shift horizontally a lower pallet with respect to said stack and reposition and re-elevate said stack with respect to a pallet next to be shifted.

A further object of the invention is to provide a pallet unstacking assembly which is readily loaded with a vertical stack of pallets by a lift truck or the like, and which is operable to eject pallets one at a time from a stack thereof.

Additional objects of the invention will appear from the following description in which the preferred embodiment of the invention has been set forth in detail in conjunction with the accompanying drawings.

Referring to the drawings:

FIG. 2 is a sectional view taken along the line 2—2 of FIG. 1;

FIG. 3 is a sectional view of a transfer conveyor feed mechanism incorporated in the present invention;

FIG. 4 is a partial sectional view of the conveyor mechanism of FIG. 3 taken along the line 4—4 of FIG. 3.

In the above mentioned application, Serial No. 216,100, filed August 10, 1962, a machine is disclosed for exchanging pallets whereby an exchange pallet is substituted for an incoming loaded pallet. That machine includes means forming three aligned conveyor sections, each adapted to support a loaded pallet for movement over the same. The first conveyor section serves as an incoming conveyor for a loaded incoming pallet and also as an incoming conveyor for an exchange pallet delivered thereto from a pallet unstacking apparatus, the subject of the present invention. The second conveyor section forms a pallet transfer or exchange station. The third conveyor section forms an outgoing conveyor for an outgoing conveyor for an outgoing loaded pallet and also serves as an outgoing conveyor for an incoming unloaded pallet to be delivered to a pallet stacker apparatus, the subject matter of my co-pending application Serial No. 481,763, filed August 23, 1965.

Figure 1:
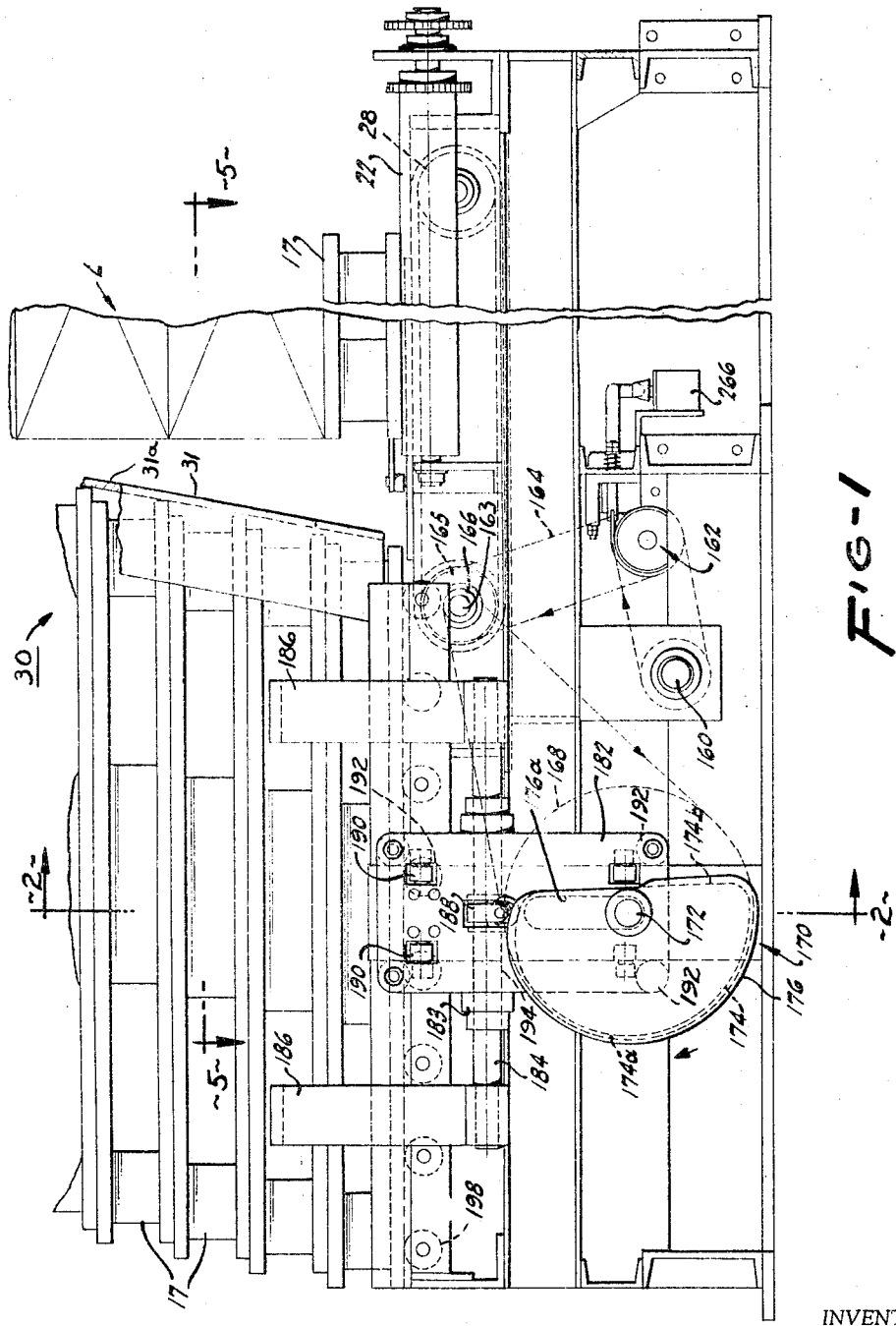
FIG. 1 is a side view showing a pallet unstacking mechanism made in accordance with and embodying the features of the present invention.

When an incoming loaded pallet is placed at the pallet transfer or exchange station, to have the load removed therefrom, an exchange pallet is positioned to be moved into the place of the incoming pallet after it is removed from the pallet transfer station. A pallet unstacking assembly wherein this is accomplished in accordance with the principles of the present invention is shown in the accompanying drawings, reference being had particularly to FIGS. 1 and 2. There will be seen there a pallet unstacking assembly designated generally 30 including a magazine 31 and an unstacking conveyor 28 which functions to deliver a exchange pallet 17 from the magazine 31 to an incoming conveyor 22 extending transversely of the unstacking conveyor 28. In FIG. 1 an incoming pallet 17 is shown supporting a load L disposed on the aforementioned aligned conveyor sections which include the incoming conveyor 22. As shown in the drawings, the aforementioned parts may be mounted upon a framework fabricated from commercially available structural shapes in a manner well understood in the art.

Figure 5:
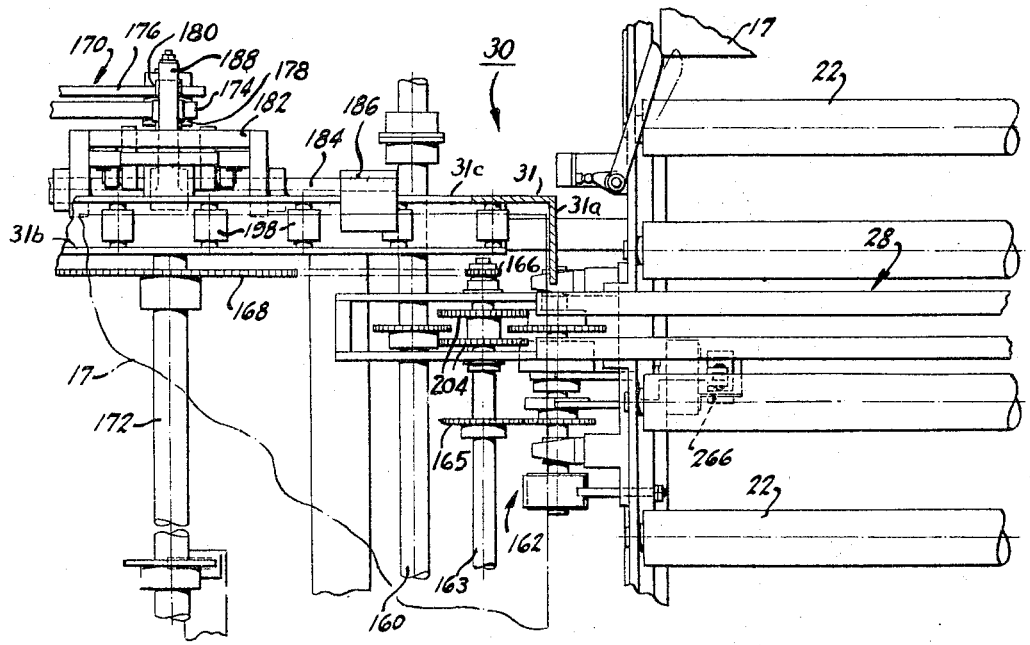
FIG. 5 is a partial top view of the pallet unstacking mechanism.

The magazine 31, as shown in FIGS. 1, 2 and 5, is arranged to hold a plurality of pallets 17 arranged in a vertical stack. A spaced apart (FIGS. 1 and 5) pair of generally vertically extending angle members 31a, suitably cut at the bottom portions to permit passage of a pallet 17, defines the forward corner portions of the magazine 31 and may be arranged at a slight angle to the vertical, as shown in FIG. 1, so that when a load of pallets has been deposited in the magazine 31 through the open rear portion by a lift truck (not shown) or the like, the corner angle members 31a naturally will serve a guiding and positioning function as to the pallets 17 in engagement therewith and ensure that the pallets in the stack, as each in turn becomes the lowest pallet, are properly positioned with respect to the unstacking conveyor 28. The lowest pallet 17 in the stack is supported at the bottom upon a spaced pair of rows of transverse feed rollers 198 which extends in the direction of the unstaking conveyor 28 and is disposed on each side thereof, as shown best in FIG. 2. Each transverse feed roller 198 is suitably journaled in an upwardly opening channel member 31b having an outer flange 31c extending vertically above the rollers 198 to define a side element of the magazine 31.

One of the functions of the pallet unstacker apparatus 30 is to shift a lower pallet from the stack of pallets in the magazine 31. A step in achieving this involves elevating a stack of pallets with respect to the pallet to be shifted. A subsequent step is to lower the stack after the pallet has been shifed from the magazine 31 so as to place the next pallet in the place of the pallet previously shifted. The stack again may then be elevated in a like respect whereby the next pallet may be shifted from the magazine 31. The mechanism through which these functions are realized includes a main drive shaft 160 which also may be the drive shaft for the stacker (not shown) and load transfer fork (not shown) disclosed in said co-pending application, Serial No. 216,100, it being understood here that a suitable motor (not shown) is provided to drive the shaft 160. A single cycle indexing clutch 162, actuated by a solenoid 266, is interposed in the drive train so that the unstacking mechanism is driven through a single cycle of operation with start and stop conditions closely controlled and coordinated with the pallet transfer apparatus of said co-pending application, Serial No. 216,100. As shown in FIG. 1, from the clutch 162 a chain 164 drives a sprocket 165 mounted on a shaft 163, and a sprocket 166 on the same shaft drives a larger sprocket 168 to rotate a composite control cam 170 keyed therewith on a shaft 172.

Referring to FIG. 2, it will be noted that a composite cam 170 is mounted on each end of the shaft 172 and each comprises a vertical motion-controlling disc 174 and a horizontal motion-controlling disc 176, each controlling movement of a roller follower 178 and 180, respectively. The follower 178 is rotatably mounted in a vertically slidable carriage 182 to which are secured bearing brackets 183 rotatably supporting a shaft 184. To each shaft 184 are keyed two or more upright pallet support arms 186 and a generally horizontal cam follower arm 188 rotatably carrying the cam follower roller 180 so that the arms 186 and 188 together form a bell crank lever.

As the vertical control followers 178 transverses the cam disc 174, the carriage 182 is raised and lowered in accordance with the high and low dwells 174a and 174b of the cam disc 174. It will also be seen from FIG. 1 that the cam disc 176 is concentric with the cam disc 174 except along a portion of the low dwell 176a. Thus, for most of the cam cycle the followers 178 and 180 move up and down in unison but in the portion 176a the horizontal control follower 180 moves down relative to the follower 178 and the bell crank is pivoted to swing the pallet support arms 186 outwardly. The vertical movement of the carriage 182 is guided by rollers 190 and 192 engaging the faces and sides, respectively, of a guide plate 194, as shown in FIGS. 1 and 2.

The upright arms 186 are adapted to support a stack of pallets 17 and under the control of the composite cam 170 rotating clockwise in FIG. 1 the arms 186 move to permit pallet feeding in a manner now to be described. Beginning in the position shown in FIG. 1, both cam followers 178 and 180 traverse the high concentric dwells so that the pallet support arms are in their uppermost position at point "a" (FIG. 2) wherein they support the pallet stack high enough to permit a pallet 17 to travel along the transverse feed rollers 198 from the magazine 31 to the incoming conveyor 22. Then, along portion 174b the followers move downwardly towards the center of rotation of the cam 170 to carry the arms 186 to point "b," low enough to bring the entire stack of pallets down to rest upon the transverse feed rollers 198. Adjacent the center of rotation of the cam 170 the outer cam disc 176 has a profile causing the bell crank lever to pivot the pallet support arms 186 outwardly to point "c" in which position may remain as the arms are raised to point "d" as the followers 178 and 180 approach the high dwell.

Then, as the cam differential is again assumed, the arms 186 move inwardly under the margins of the pallet 17 at point "e" before the arms are raised to their initial support position at point "a."

When the pallet to be shifted from the magazine 31 is lowered on to the transverse conveyor rollers 198 by the support arms 186 it is in a position to be engaged by a feed dog 200 (FIG. 3) carried on a chain 202 of the unstacking conveyor 28 to travel between the magazine 31 and the incoming conveyor 22. With the arms 186 elevating the pallet stack in position "a," shown in FIG. 2, the feed dog 200 moves up to engage the edge of the pallet frame.

The chain 202 is driven by double sprockets 204 on the shaft 163 (FIG. 1) and, hence, in timed relation to the composite cam 170 controlling the pallet support arms 186. As the stack above the bottom pallet is elevated by the arms 186, the feed dog 200 is cammed into operative position by a cam bar 208 so that a pallet 17 is pulled from the magazine 31 across the incoming conveyor 22. Near the end of its travel, the feed dog 200 falls from the trailing end 209 of the cam bar 208 to drop free of the pallet to the position shown in phantom lines of FIG. 3, so that the pallet may be moved by the incoming conveyor 22.

To summarize the operation of the pallet unstacker 30, it will be assumed that a stack of pallets 17 has been placed in the magazine 31 through the rear portion thereof by a lift truck or the like apparatus (not shown) so as to rest the stack upon the rows of transverse feed rollers 198. The drive shaft 160 is rotated by a prime mover (not shown) associated with the pallet exchange apparatus disclosed in said co-pending application, Serial No. 216,100. Through the associated drive train the shaft 172 and the composite cams 170 are rotated in the direction of the arrows shown in FIG. 1 to elevate the pallets disposed above the bottom pallets 17 from the position shown in FIG.1 to a position where the support arms 186 support the stack of pallets in the position indicated at point "a" in FIG. 2. At this time, the bottom pallet will be disengaged from the pallets disposed thereabove and, thus, the bottom pallet may be shifted horizontally by the unstacking conveyor 28 through engagemet of the dog 200 with a pallet 17. The pallet is shifted from the magazine 31 towards the incoming conveyor 22.

Continuing the cycle, the composite cams 170 lower the stack of pallets 17 so that the bottom pallet engages the rows of feed rollers 198 to be supported thereon. The arms 186 and carriages 182 are brought to their lowermost position, e.g., position "b," as shown in FIG. 2, the arms then being in a non-engaging relationship with the pallets. The arms 186 are then pivoted outwardly into position "c" in conformance with the program of cam disc 176.

The carriages 182 and the arms 186, then disengaged from the stack, are caused to move upwardly to position "d" in response to the program of cam disc 174. Thereafter, the arms 186 are caused to move inwardly to position "e" in accordance with the program of cam disc 176, this being the end of this cycle. During the cycle of the composite cam 170, the feed dog 200 on the unstacking conveyor 28 has also moved through one complete cycle at the end of which it occupies the position shown in full lines of FIG. 3.

From the foregoing, it is clear that the apparatus shown and described is useful for unstacking pallets from a vertical stack thereof and for delivering a pallet towards a pallet exchange station or the like. While there has been described what is considered at present to be the preferred embodiment of the invention, it will be understood that various modifications may be made therein and it is intended to cover in the appended claims all such modifications as fall within the true spirit and scope of the invention.

I claim:

1. A pallet supply mechanism comprising a magazine for retaining a plurality of pallets in a vertical stack, pallet transfer means extending into the lower portion of said magazine for shifting horizontally a bottom pallet relative to others in such stack, a pair of carriages each mounted for vertical movement on one side of said magazine, cam means rotatably mounted adjacent to each carriage, a rocker shaft rotatably mounted on each carriage and vertically movable therewith, at least one pallet-engaging support arm secured to said rocker shaft for pivotal movement into and out of engagement with a pallet in said stack, each of said cam means including a first cam serving to move the corresponding carriage vertically, and a second cam serving to rotate the corresponding rocker shaft to pivot the corresponding arm with respect to said stack, power means for cyclically rotating said cam means, cam follower means on said carriage and on said rocker shaft respectively engaging said first and second cams, said cam means being formed whereby in one cycle of rotation they effect movement of said carriages together with said arms downwardly to deposit said stack on said pallet transfer means, said arms are swung outwardly to effect disengagement with the lower pallet in said stack, said carriages are moved with said arms upwardly to the level of the second pallet from the bottom one of said stack, said arms are moved inwardly to engage said second pallet, and then said carriages are raised with said arms thereby to raise the remaining pallets in said stack to free the bottom pallet for removal by the transfer means.

2. The apparatus of claim 1 wherein said pallet transfer means operates to shift the bottom pallet with respect to said magazine when the stack of pallets is held on said arms in an elevated condition.

3. A pallet supply mechanism comprising: a magazine including a pair of opposing upright sides adapted to accommodate a stack of pallets therebetween, a conveyor extending into the lower portion of the magazine and adapted to move pallets away from said magazine, a pair of carriages, each mounted for vertical movement on one side of said magazine, at least one pallet-supporting arm pivotally mounted on each of said carriages, said arms being movable to engage or disengage opposite sides of a lower pallet of a stack of pallets, and first and second pairs of cams rotatable together to operate said carriages and said arms, respectively, the first pair of said cams being formed to lower said carriages with said arms in engagement with the bottom pallet to deposit said stack on said conveyor, the second pair of cams being formed to pivotaly move said arms outwardly out of engagement with said lower pallet after the stack has been deposited, said first pair of cams also thereafter serving to elevate said carriages with said arms out of engagement with the pallets to the level of the second pallet from the bottom of said stack, the second pair of cams then serving to pivot said arms inwardly to engage said second pallet, the first pair of cams thereafter serving to raise said carriages with said arms upwardly to raise the second pallet to those above the same whereby the bottom pallet is free for removal from the magazine by the conveyor.

References Cited by the Examiner

UNITED STATES PATENTS

| 2,769,570 | 11/1956 | Adams | 221—225 |
| 3,003,661 | 10/1961 | McGrath | 221—297 X |
| 3,013,680 | 12/1961 | Paxton | 214—8.5 X |
| 3,037,645 | 6/1962 | Simpkins | 214—6.2 |
| 3,053,402 | 9/1962 | Russell | 214—6.2 |

MARVIN A. CHAMPION, *Primary Examiner.*

MORRIS TEMIN, *Examiner.*